(12) United States Patent
Baik et al.

(10) Patent No.: US 8,995,068 B2
(45) Date of Patent: Mar. 31, 2015

(54) IMAGE PHOTOGRAPHING DEVICE

(75) Inventors: Jae Ho Baik, Gyeonggi-do (KR); Jae Hyuk Lee, Gyeonggi-do (KR); Yong Gyu Yoon, Seoul (KR); Jung Seok Lee, Gyeonggi-do (KR); Myung Jin Lee, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 126 days.

(21) Appl. No.: 13/464,501

(22) Filed: May 4, 2012

(65) Prior Publication Data

US 2012/0320467 A1   Dec. 20, 2012

(30) Foreign Application Priority Data

Jun. 14, 2011   (KR) ......................... 10-2011-0057627

(51) Int. Cl.
| | |
|---|---|
| G02B 7/02 | (2006.01) |
| G02B 7/08 | (2006.01) |
| H04N 5/225 | (2006.01) |
| G03B 3/10 | (2006.01) |

(52) U.S. Cl.
CPC ................ G02B 7/08 (2013.01); *H04N 5/2257* (2013.01); *G03B 3/10* (2013.01)
USPC ....................................................... 359/824

(58) Field of Classification Search
CPC ........... G02B 7/08; G03B 3/10; H04N 5/2257
USPC ........................................ 359/824, 694–698
See application file for complete search history.

(56) References Cited

U.S. PATENT DOCUMENTS

| | | | | |
|---|---|---|---|---|
| 4,148,574 | A * | 4/1979 | Johnson ...................... | 396/105 |
| 8,000,027 | B2 * | 8/2011 | Hirata et al. ................. | 359/694 |
| 2004/0174614 | A1 * | 9/2004 | Hovanky ...................... | 359/694 |
| 2009/0059373 | A1 * | 3/2009 | Lam et al. .................... | 359/557 |

FOREIGN PATENT DOCUMENTS

| | | |
|---|---|---|
| JP | 2005-148109 | 6/2005 |
| JP | 2006-58662 | 3/2006 |
| JP | 2006-072165 | 3/2006 |
| JP | 2006-251728 | 9/2006 |
| JP | 2007-264020 | 10/2007 |
| JP | 2009-282090 | 12/2009 |
| KR | 10-2010-0058859 | 6/2010 |
| KR | 10-1012720 | 1/2011 |
| KR | 10-2011-0011192 | 2/2011 |
| KR | 10-1026179 | 3/2011 |

OTHER PUBLICATIONS

Korean Office Action issued Sep. 14, 2012 in corresponding Korean Patent Application No. 10-2011-0057627.
Japanese Office Action issued Jul. 23, 2013 in corresponding Japanese Patent Appplication No. 2012-097704.
Japanese Office Action issued Mar. 4, 2014 in corresponding Japanese Patent Application No. 2012-097704.

* cited by examiner

*Primary Examiner* — Thomas K Pham
*Assistant Examiner* — Vipin Patel

(57) ABSTRACT

Disclosed herein is an image photographing device capable of being auto-focused while moving a lens barrel in an optical axis direction. The image photographing device includes: a lens barrel having at least one lens; a housing receiving the lens barrel therein so that the lens barrel moves in an optical axis direction; and an impact reducing unit elastically supporting the lens barrel in the case in which the lens barrel deviates from a set movement range, thereby primarily damping the lens barrel before the lens barrel deviates from the movement range to collide with other components positioned at an outer side of the lens barrel.

7 Claims, 3 Drawing Sheets

- PRIOR ART -

- PRIOR ART -

IMAGE PHOTOGRAPHING DEVICE

CROSS REFERENCE(S) TO RELATED APPLICATIONS

This application claims the benefit under 35 U.S.C. Section 119 of Korean Patent Application Serial No. 10-2011-0057627, entitled "Image Photographing Device" filed on Jun. 14, 2011, which is hereby incorporated by reference in its entirety into this application.

BACKGROUND OF THE INVENTION

1. Technical Field

The present invention relates to an image photographing device, and more particularly, to an image photographing device capable of being miniaturized to have a simple structure by improving a damping structure, reducing a impact amount of a lens barrel, reducing generation of noise due to impact, and preventing generation of pre-pressure at the time of driving the lens barrel to reduce power consumption.

2. Description of the Related Art

Recently, use of a subminiature camera for a mobile has been gradually increased in a mobile device such as a mobile phone, a notebook, a tablet PC, or the like. The demand of customers for the subminiature camera used in the mobile device and having a high pixel of five million pixels or more and a multi-function such as a zoom function, an auto focus (AF) function, and the like has been increased.

Generally, a camera module used in the mobile device may be configured to include an optical system having a lens, a lens driver moving the optical system in an optical axis direction to adjust a focus, and an image sensor photographing light input through the optical system to convert the photographed light into an image signal.

The camera module configured as described above moves an optical system, that is, a lens barrel including at least one lens along with the optical axis direction through the lens driver such as an actuator in order to auto-focus the optical system on the image sensor In the case of the image photographing device such as the camera module according to the related art, in order to prevent noise of the lens barrel due to external impact, a protruding portion is formed on a housing of the actuator surrounding the lens barrel to limit a movement of the lens barrel in the optical axis direction as shown in FIG. 1, and an elastic member is interposed on an upper side of the lens barrel to provide pre-pressure to the lens barrel as shown in FIG. 2.

However, in the case of an image photographing device 10 shown in FIG. 1, since a lens barrel 11 is supported in a housing, that is, a member fixed at the time of driving the lens barrel 11, by an elastic member 13, elastic force of the elastic member 13 acts as pre-pressure in a direction opposite to a movement direction of the lens barrel 11 along with an optical axis. Therefore, since driving force for driving the lens barrel 11 cannot but increase, power consumption increases. In addition, when the elastic member 13 is deformed, the elastic force of the elastic member 13 is changed at the time of driving the lens barrel 11, such that it is difficult to linearly drive the lens barrel 11, thereby deteriorating capacity and reliability.

In addition, in the case of an image photographing device 20 shown in FIG. 2, as elastic force of an elastic member 23, that is, a compression coil spring, interposed on an upper side of a lens barrel 21 acts as pre-pressure force, such that power consumption increases at the time of driving the lens barrel 21 in an optical axis direction. In addition, when excessive external impact occurs, the elastic member 23 is permanently deformed, such that it is difficult to linearly drive the lens barrel 11, thereby deteriorating capacity and reliability.

In addition, in accordance with the recent trend toward an increase in pixel and miniaturization of an image photographing device such as a camera module, it is important to move a lens barrel in an optical axis direction without a tilt, such that a rolling support scheme by a ball, a driving support scheme by a shaft, or the like, instead of a scheme of supporting the lens barrel by an elastic member has been applied. In this case, only generation of a tilt with respect to movement of the lens barrel in the optical axis direction may be prevented, and a damage and noise are generated due to impact between the lens barrel and other structures at the time of applying external impact or external power to the lens barrel.

SUMMARY OF THE INVENTION

An object of the present invention is to provide an image photographing device capable of damping an impact amount of a lens barrel due to external impact and thus reducing noise generation by improving a damping structure of a lens barrel.

Another object of the present invention is to provide an image photographing device capable of reducing a power consumption amount by preventing pre-pressure generation at the time of driving of a lens barrel within a set movement range even though a damping structure of the lens barrel is applied.

Another object of the present invention is to provide an image photographing device capable of being miniaturized by simplifying a damping structure of a lens barrel.

According to an exemplary embodiment of the present invention, there is provided: an image photographing device including: a lens barrel having at least one lens; a housing receiving the lens barrel therein so that the lens barrel moves in an optical axis direction; and an impact reducing unit elastically supporting the lens barrel in the case in which the lens barrel deviates from a set movement range, thereby primarily damping the lens barrel before the lens barrel deviates from the movement range to collide with other components positioned at an outer side of the lens barrel.

The impact reducing unit may include an elastic member provided in the lens barrel or the housing, and having elastic force in the optical axial direction of the lens barrel; and a stopper provided at an opposite side of the elastic member in the lens barrel or the housing and allowing at least one side of the elastic member to be caught thereon in the case in which the lens barrel deviates from the set movement range, thereby allowing elastic restoration force of the elastic member to act in a direction opposite to a movement direction of the lens barrel.

The elastic member may include a fixed part fixed to the lens barrel or the housing, an elastic part extended from the fixed part to provide the elastic force of the elastic part, and a catching part extended from the elastic part to thereby be caught to the stopper in the case in which the lens barrel deviates from predetermined movement range.

Each of the elastic part and the catching part may be formed in both facing sides of the fixed part.

The stopper may include a stop part on which one side of the elastic member is caught when the lens barrel moves to a subject in the optical axis direction, and a second stop part on which one side of the elastic member is caught when the lens barrel moves in a direction opposite to the subject in the optical axis direction.

The spaced distance between the first stop part and the second stop part may be equal to or more than the set movement range of the lens barrel.

The image photographing device may further include an actuator having a driving part for moving the lens barrel in the optical axis direction.

The driving part of the actuator may move the lens barrel in an ultrasonic motor scheme of using a piezo, or a voice coil motor (VCM) scheme of generating electromagnetic force using a coil and a magnet, or a scheme of using a shape memory alloy.

The image photographing device may further include a shield case coupled to an outer side of the housing.

DESCRIPTION OF THE PREFERRED EMBODIMENTS

The acting effects and technical configuration with respect to the objects of a suspension for compensating for hand vibration and an image photographing device having the same according to the present invention will be clearly understood by the following description in which exemplary embodiments of the present invention are described with reference to the accompanying drawings.

Hereinafter, the image photographing device according to the present invention will be described in more detail with reference to the accompanying drawings.

Figure 1:
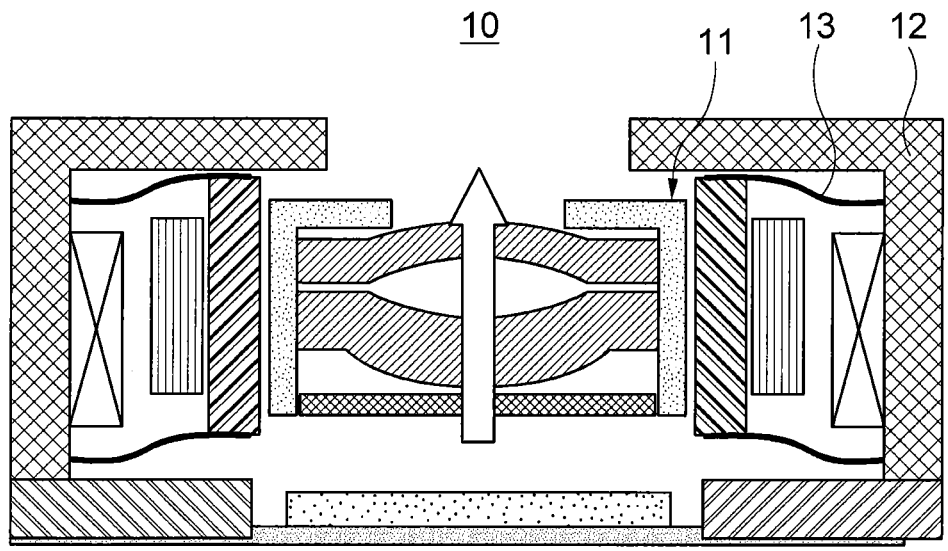
FIG. 1 is a cross-sectional view schematically showing an example of an image photographing device according to the related art.
Figure 2:
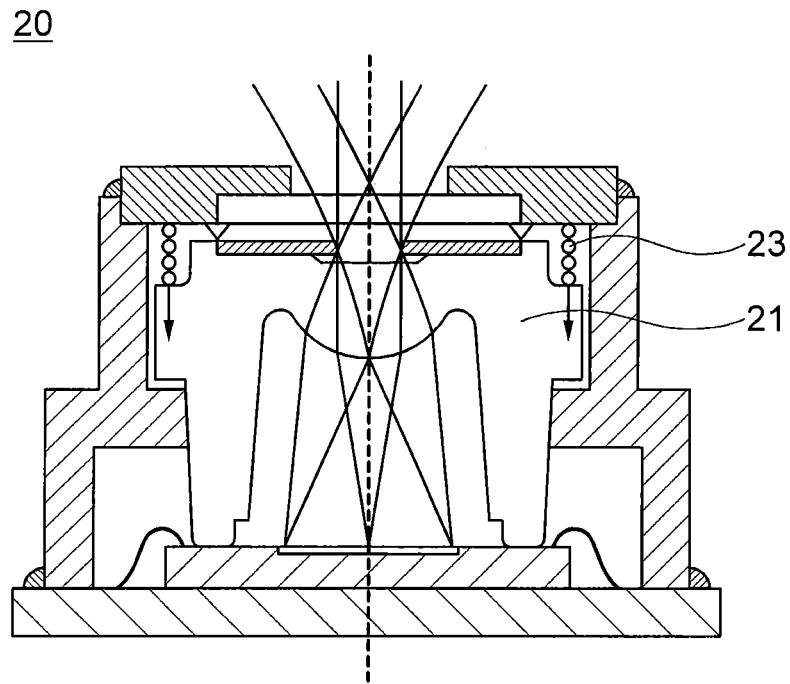
FIG. 2 is a cross-sectional view schematically showing another example of the image photographing device according to the related art.
Figure 3:
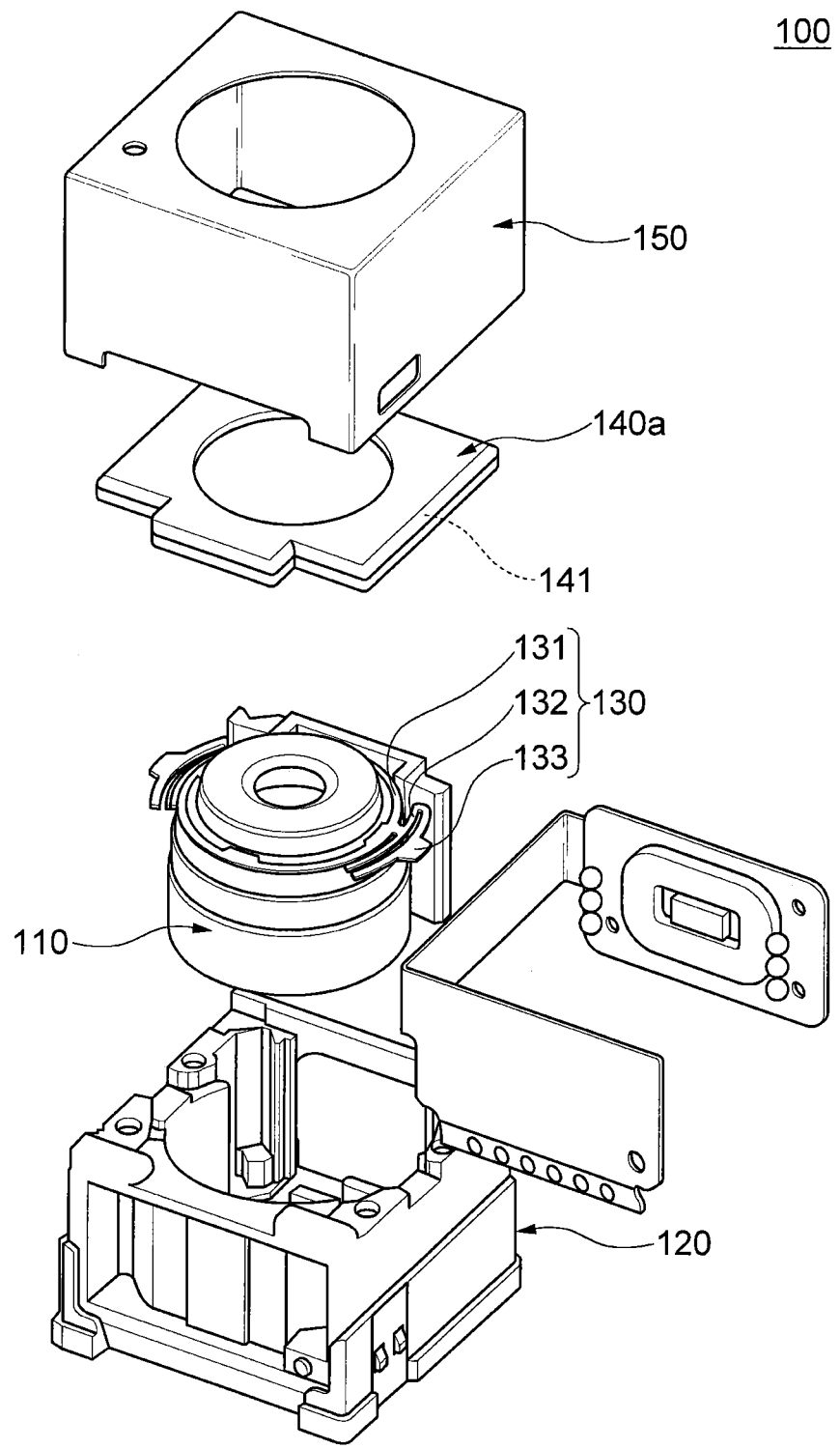
FIG. 3 is an exploded perspective view schematically showing an image photographing device according to an exemplary embodiment of the present invention.
Figure 4:
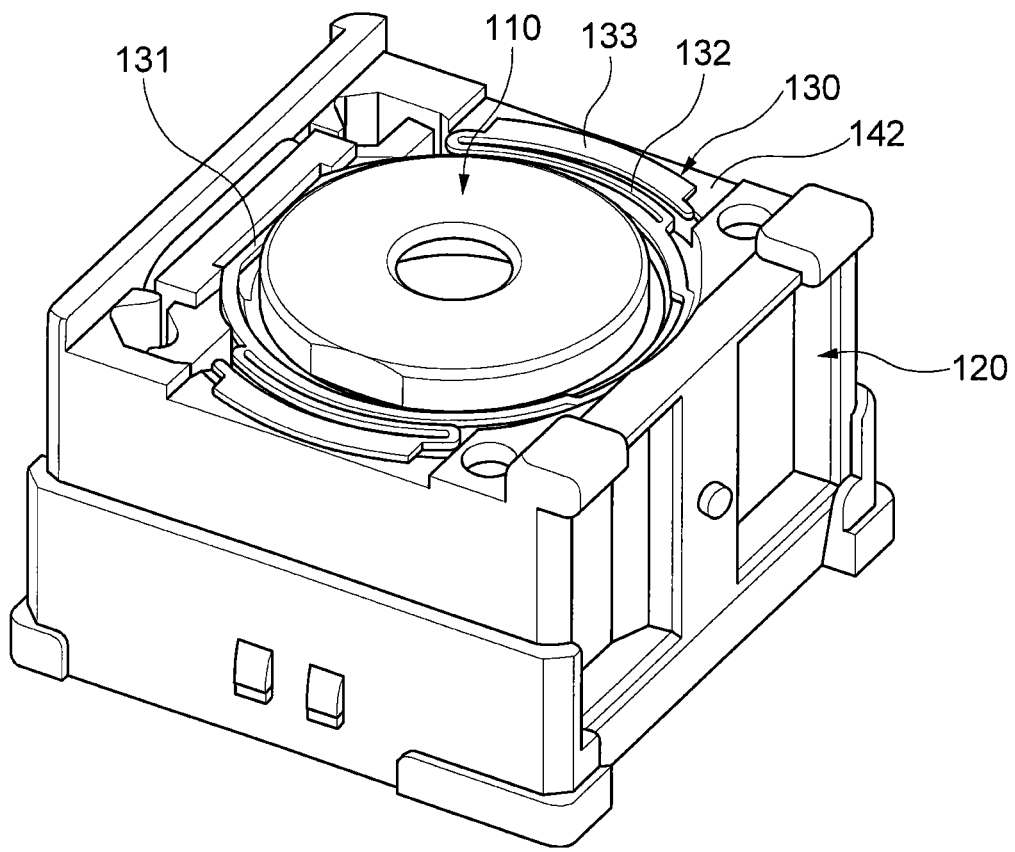
FIG. 4 is a assembled perspective view schematically showing the image photographing device according to the exemplary embodiment of the present invention.
Figure 5:
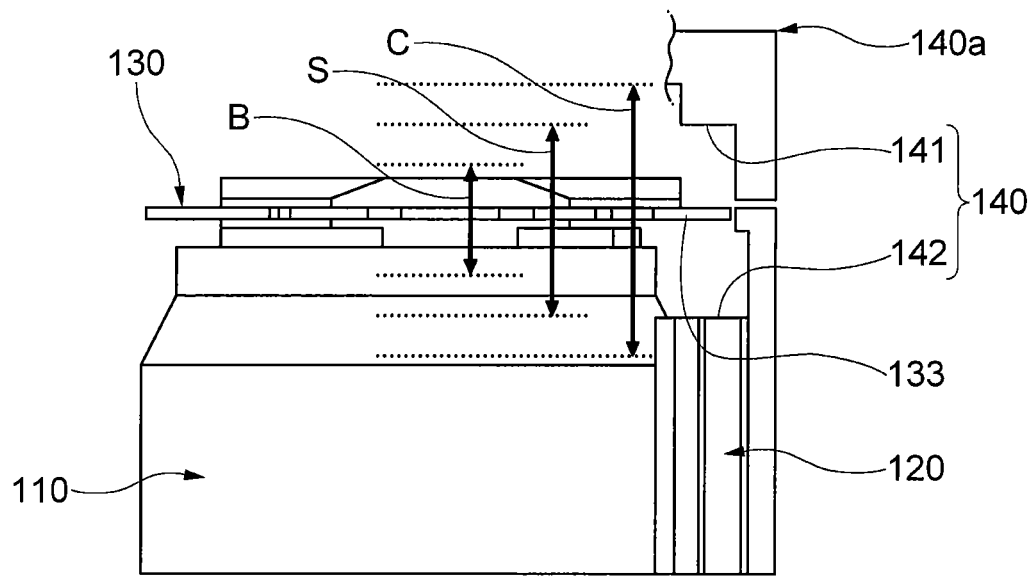
FIG. 5 is a configuration diagram schematically showing a set movement range of a lens barrel, a spaced range of a stopper, and a structural impact range of the lens barrel in the image photographing device according to the exemplary embodiment of the present invention.

FIG. 3 is an exploded perspective view schematically showing an image photographing device according to an exemplary embodiment of the present invention, FIG. 4 is a assembled perspective view schematically showing the image photographing device according to the exemplary embodiment of the present invention, and FIG. 5 is a configuration diagram schematically showing a set movement range of a lens barrel, a spaced range of a stopper, and a structural impact range of the lens barrel in the image photographing device according to the exemplary embodiment of the present invention.

Referring to FIGS. 3 to 5, the image photographing device 100 according to the exemplary embodiment of the present invention may be configured to include a lens barrel 110, a housing 120, and an impact reducing unit.

The lens barrel 110 may have at least one lens (L) mounted therein, and be received in the housing 120 so as to be movable in an optical axis direction That is, the lens barrel 110 may move in the housing 120 in the optical axis direction through an actuator to be described below in order to auto-focus an optical system to an image sensor (not shown).

The housing 120 may have a space formed therein so that the lens barrel 110 is received therein so as to be movable in the optical axis direction, and have a square shape in which an upper end portion and an lower end portion thereof are opened. In addition, an inner portion of the housing 120 may be embedded with an actuator for driving the lens barrel in the optical axis direction, and the lower end portion of the housing 120 may be installed with a substrate having an image sensor mounted thereon.

The impact reducing unit elastically supports the lens barrel 110 in the case in which the lens barrel 110 deviates from a set movement range, that is, an auto focus adjustment section, thereby making it possible to primarily damp the lens barrel 110 before the lens barrel 110 deviates from the set movement range to collide with other components.

More specifically, the impact reducing unit may be configured to include an elastic member 130 provided in the lens barrel 110 and having an elastic force in the axial direction of the lens barrel 110 and a stopper 140 provided in the housing 120 so as to correspond to the elastic member 130 to allow at least one side of the elastic member 130 to be caught thereon when the lens barrel 110 deviates from the set movement range.

That is, the elastic member 130 may be fixed to the lens barrel 110 to move together with the lens barrel 110 and the stopper 140 may be fixed to the housing 120. Therefore, when the lens barrel 110 deviates from the set movement range, one side of the elastic member 130 is caught on the stopper 140, such that elastic restoration force of the elastic member 130 may act in a direction opposite to a movement direction of the lens barrel 110.

Therefore, when the lens barrel 110 deviates from the set movement range by external impact or external force, the lens barrel 110 is primarily damped by the elastic restoration force of the elastic member 130 and then secondarily collides with other structures, thereby making it possible to reduce an impact amount and noise of the lens barrel 110.

Here, the elastic member 130 may include a fixed part 131 fixed to the lens barrel 110, an elastic part 132 extended from the fixed part 131 to provide the elastic force of the elastic part 130, and a catching part 133 extended from the elastic part 132 to thereby be caught on the stopper 140 when the lens barrel 110 deviates from the set movement range.

Here, each of the elastic part 132 and the catching part 133 may be formed in both facing sides of the fixing part 131.

That is, the elastic member 130 may be formed of a circular plate spring provided in an edge part of an upper end of the lens barrel 110.

In addition, the stopper 140 may be configured to include a first stop part 141 on which one side of the elastic member 130, that is, the catching part 133 is caught when the lens barrel 110 moves to a subject in the optical axis direction, and a second stop part 142 on which one side of the elastic member 130, that is, the catching part 133 is caught when the lens barrel 110 moves in a direction opposite to the subject in the optical axis direction.

Here, the second stop part 142 may be formed at a portion corresponding to the catching part 133 of the elastic member 130 in the upper end portion of the housing 120, and the first stop part 141 may be formed at a portion corresponding to the second catching part 142 of a stop member 140a provided in the upper end portion of the housing 120.

Although not shown in detail, the first stop part 141 and the second stop part 142 may be formed integrally with each other in a hole shape or a hook shape such as a '⊏' shape on an upper portion of the housing 120, or may be formed integrally with each other in a hole shape or a hook shape such as a '⊏' shape on the stop member 140a.

In this configuration, the center of the stop member 140 may be formed with an opening part exposing an upper end surface of the lens barrel 110 so that the lens barrel 110 does not deviate from the set movement range.

Therefore, when the lens barrel 110 deviates from the set movement range toward the subject, the lens barrel 110 is primarily damped by the elastic restoration force of the elastic member 130 generated by a catching structure of the elastic member 130 and the stop part 140 and then secondarily collides with an inner side around the opening part of the stop member 140a, thereby making it possible to reduce an impact amount and noise of the lens barrel 110.

Meanwhile, a spaced range S between the first stop part 141 and the second stop part 142 may be more than the set movement range B of the lens barrel 110.

That is, a distance from a position at which the catching part 133 of the elastic member 130 is caught on any one of the first stop part 141 and the second stop part 142 to a position in which the catching part 133 of the elastic member 130 is caught on the other thereof may be larger than a set auto focus length of the lens barrel 110.

In this case, a range C in which the lens barrel 110 deviates from the set movement range in the optical axis direction to vertically collide with other components positioned at a vertical outer side may be larger than a spaced range S between the first stop part 141 and the second stop part 142.

Therefore, in the image photographing device 100 according to the present embodiment, only when the lens barrel 110 deviates from the set movement range, the elastic restoration force of the elastic member 130 may act, and when lens barrel 110 is within the set movement range, a phenomenon that the elastic restoration force of the elastic member 130 acts as pre-pressure is prevented, thereby making it possible to minimize power consumption for driving the lens barrel 110.

Meanwhile, the image photographing device 100 according to the present embodiment may include an actuator having a driving part for moving the lens barrel 110 in the optical axis direction as described above.

Here, the driving part of the actuator may move the lens barrel in an ultrasonic motor scheme of using a piezo, or a voice coil motor (VCM) scheme of generating electromagnetic force using a coil and a magnet, or a scheme of using a shape memory alloy. According to the present embodiment, the driving part in the VCM scheme is disclosed. Since the driving part in the VCM scheme may be easily applied by those skilled in the art, a detailed description thereof will be omitted.

In addition, in the image photographing device 100 according to the present embodiment, a rolling support scheme by a ball and a guide groove has been disclosed as a support scheme of the lens barrel 110 in order to move the lens barrel 100 in the optical axis direction without a tilt, but it is not limited thereto. That is, a support scheme by a shaft and groove may also be applied.

Therefore, the image photographing device 100 according to the present embodiment may independently and linearly drive the lens barrel 110 while effectively preventing the tilt and generation of the pre-pressure of the lens barrel 110 at the time of driving the lens barrel 110 in the optical axis direction.

Meanwhile, the image photographing device 100 according to the present embodiment may further include a shield case 150 coupled to an outer side of the housing 120.

That is, the shield case 150 may be provided so as to cover the housing 120 and the stop member 140a. In this case, each of the shield case 150 and the stop member 140a may be formed with an opening part so as to expose an upper end surface of the lens barrel 110.

In the case in which the image photographing device 100 according to the present embodiment includes the shield case 150, the lens barrel 110, the lens barrel 110 is primarily damped by the elastic restoration force of the elastic member 130 generated by the catching structure of the elastic member 130 and the stop part 140, and then secondarily collides with an inner side surface around the opening part of the shield case 150 instead of an inner side surface around the opening part of the stop member 140a, thereby making it possible to reduce the impact amount the noise of the lens barrel 110.

Meanwhile, although not shown in detail, even though the present embodiment has disclosed that the elastic member 130 is caught on the stopper 140 while moving together with the lens barrel 110, the present invention is not limited thereto. The elastic member 130 is fixedly provided in the housing 120 and the stopper 140 is provided in the lens barrel 110, such that when the lens barrel 110 deviates from the set movement range, the elastic member 130 may also be caught on the stopper 140.

As set forth above, with the image photographing device according to the exemplary embodiment of the present invention, the damping structure of the lens barrel is improved to damp the impact amount of the lens barrel due to external impact, thereby making it possible to reduce noise generation.

In addition, with the image photographing device according to the exemplary embodiment of the present invention, the lens barrel is damped and generation of pre-pressure acting on the lens barrel is prevented in the case in which the lens barrel moves within a set movement range, thereby making it possible to reduce the power consumption amount.

In addition, with the image photographing device according to the exemplary embodiment of the present invention, the damping structure of the lens barrel with respect to external impact is simplified, thereby making it possible to miniaturize the image photographing device, reduce a manufacturing cost, and improve marketability and productivity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An image photographing device comprising:
a lens barrel having at least one lens;
a housing receiving the lens barrel therein so that the lens barrel moves in an optical axis direction; and
an impact reducing unit elastically supporting the lens barrel when the lens barrel deviates from a set movement range, thereby primarily damping the lens barrel before the lens barrel deviates from the movement range to collide with other components positioned at an outer side of the lens barrel, wherein
the impact reducing unit includes:
an elastic member provided in the lens barrel or the housing, and having elastic force in the optical axial direction of the lens barrel, the elastic member including a fixed part fixed to the lens barrel or the housing, an elastic part extended from the fixed part to provide the elastic force of the elastic member, and a catching part extended from the elastic part to thereby be caught to the stopper when the lens barrel deviates from a predetermined movement range; and a stopper provided at an opposite side of the elastic member in the lens barrel or the housing and allowing at least one side of the catching part of the elastic member to be caught thereon in the case in which the lens barrel deviates from the set movement range, thereby allowing elastic restoration force of the catching part of the elastic member to act in a direction opposite to a movement direction of the lens barrel.

2. The image photographing device according to claim 1, wherein the elastic part and the catching part is formed in each of both facing sides of the fixed part.

3. The image photographing device according to claim 1, wherein the stopper includes:

a stop part on which one side of the elastic member is caught when the lens barrel moves to a subject in the optical axis direction, and a second stop part on which one side of the elastic member is caught when the lens barrel moves in a direction opposite to the subject in the optical axis direction.

4. The image photographing device according to claim 3, wherein a spaced distance between the first stop part and the second stop part is equal to or more than the set movement range of the lens barrel.

5. The image photographing device according to claim 1, further comprising an actuator having a driving part for moving the lens barrel in the optical axis direction.

6. The image photographing device according to claim 5, wherein the driving part of the actuator move the lens barrel in an ultrasonic motor scheme of using a piezo, or a voice coil motor (VCM) scheme of generating electromagnetic force using a coil and a magnet, or a scheme of using a shape memory alloy.

7. The image photographing device according to claim 1, further comprising a shield case coupled to an outer side of the housing.

* * * * *